US011420368B2

(12) United States Patent
Mao et al.

(10) Patent No.: US 11,420,368 B2
(45) Date of Patent: Aug. 23, 2022

(54) METHOD FOR THE PREPARATION OF COMPOSITE MATERIAL IN SANDWICH FORM

(71) Applicant: SAINT-GOBAIN PERFORMANCE PLASTICS FRANCE, Charny Orée de Puisaye (FR)

(72) Inventors: Gaëtan Mao, Pessac (FR); Nicolas Dumont, Gradignan (FR)

(73) Assignee: SAINT-GOBAIN PERFORMANCE PLASTICS FRANCE

( * ) Notice: Subject to any disclaimer, the term of this patent is extended or adjusted under 35 U.S.C. 154(b) by 221 days.

(21) Appl. No.: 16/714,965

(22) Filed: Dec. 16, 2019

(65) Prior Publication Data
US 2020/0189157 A1 Jun. 18, 2020

(30) Foreign Application Priority Data
Dec. 18, 2018 (FR) ...................... 1873207

(51) Int. Cl.
*B32B 37/02* (2006.01)
*B32B 5/12* (2006.01)
(Continued)

(52) U.S. Cl.
CPC .... *B29C 45/14508* (2013.01); *B29C 45/0001* (2013.01); *B29C 45/0005* (2013.01); *B29C 45/14786* (2013.01); *B29C 45/7207* (2013.01); *B29C 70/086* (2013.01); *B29C 70/70* (2013.01); *B32B 3/12* (2013.01); *B32B 5/026* (2013.01); *B32B 5/12* (2013.01); *B32B 7/12* (2013.01); *B32B 37/02* (2013.01); *B32B 37/10* (2013.01); *B32B 37/146* (2013.01); *B32B 37/16* (2013.01); *B32B 38/10* (2013.01); *B29C 2043/182* (2013.01); *B29C 2045/1454* (2013.01); *B29C 2045/1477* (2013.01); *B29C 2045/1825* (2013.01); *B29K 2023/12* (2013.01);
(Continued)

(58) Field of Classification Search
CPC .... B29C 2045/1454; B29C 2045/1477; B29C 2045/1825; B29C 70/68; B29C 70/18; B29C 70/34; B29C 70/467; B29C 70/48; B29C 70/541; B29C 70/681; B29C 70/086; B29C 70/70; B29C 35/02; B29C 35/16; B29C 45/14508; B29C 45/0001; B29C 45/0005; B29C 45/14786; B29C 45/7207; B29C 2043/182; B29C 65/02; B29C 65/18; B29C 66/7212; B29D 99/0021; B29D 24/005; B29D 24/002; B29K 2023/12; B29K 2063/00; B29K 2069/00; B29K 2071/00; B29K 2079/085; B29K 2277/00; B29K 2307/04; B29K 2309/08; B29K 2083/00; B29K 2101/10; B29K 2101/12; B29K 2105/0872; B32B 19/02; B32B 19/04; B32B 19/06; B32B 37/02; B32B 37/10; B32B 37/146; B32B 37/16; B32B 2262/0253; B32B 2262/0269; B32B 2262/062; B32B 2262/101; B32B 2262/103; B32B 2262/106; B32B 2262/12; B32B 2305/024; B32B 2305/076; B32B 2305/182; B32B 2250/03; B32B 2250/40; B32B 2260/021; B32B 2260/046; B32B 2260/10; B32B 2307/72; B32B 2307/732; B32B 5/026; B32B 5/12; B32B 5/18; B32B 2/26; B32B 5/245; B32B 3/12; B32B 7/12; B32B 38/10; B32B 2309/105; B32B 2266/0271; B32B 2266/0214; B32B 2605/08; B32B 2307/714; B32B 2605/18; B32B 9/007; B32B 9/046; B32B 17/04; B32B 17/066
USPC ........... 156/60, 247, 249, 289, 308.2, 309.6, 156/307.1, 313, 902; 428/116, 118, 113, 428/902
See application file for complete search history.

(56) References Cited
U.S. PATENT DOCUMENTS 3,687,223 A * 8/1972 Streck ..................... E04C 2/365
181/292
4,093,147 A 6/1978 Bromley et al.
(Continued)

FOREIGN PATENT DOCUMENTS
CH 655049 A5 3/1986
DE 102013108645 B4 * 5/2021 ............. B32B 27/20
(Continued)

OTHER PUBLICATIONS
Cherif et al, "Development of a process chain for the realization of a multilayer weft knitted fabrics showing complex 2D/3D geometries for composite applications", Textile Research Journal, 82 (2012) pp. 1195-1210.
(Continued)

Primary Examiner — Philip C Tucker
Assistant Examiner — Brian R Slawski
(74) Attorney, Agent, or Firm — Abel Schillinger, LLP; Adrian Lawrence

(57) ABSTRACT
The object of the invention can be a method of manufacturing a product in the form of a sandwich comprising a core and outer layers. The outer layers may be composed of composite material comprising a fiber-reinforced polymeric matrix. The method uses an insert of heat-resistant material, for example silicone. The object of this invention can be to provide a method of manufacturing a sandwich that dissociates the choice of material of the core of the sandwich from the choice of the material of the outer layers.

11 Claims, No Drawings

(51) Int. Cl.
| | |
|---|---|
| *B32B 37/10* | (2006.01) |
| *B32B 37/14* | (2006.01) |
| *B32B 3/12* | (2006.01) |
| *B32B 5/02* | (2006.01) |
| *B32B 7/12* | (2006.01) |
| *B29C 70/08* | (2006.01) |
| *B32B 37/16* | (2006.01) |
| *B32B 38/10* | (2006.01) |
| *B29C 70/70* | (2006.01) |
| *B29K 23/00* | (2006.01) |
| *B29K 63/00* | (2006.01) |
| *B29K 69/00* | (2006.01) |
| *B29K 71/00* | (2006.01) |
| *B29K 79/00* | (2006.01) |
| *B29C 45/14* | (2006.01) |
| *B29C 45/00* | (2006.01) |
| *B29C 45/72* | (2006.01) |
| *B29C 45/18* | (2006.01) |
| *B29K 277/00* | (2006.01) |
| *B29K 307/04* | (2006.01) |
| *B29K 309/08* | (2006.01) |
| *B29C 43/18* | (2006.01) |

(52) U.S. Cl.
CPC ...... *B29K 2063/00* (2013.01); *B29K 2069/00* (2013.01); *B29K 2071/00* (2013.01); *B29K 2079/085* (2013.01); *B29K 2277/00* (2013.01); *B29K 2307/04* (2013.01); *B29K 2309/08* (2013.01); *B32B 2305/024* (2013.01); *B32B 2305/076* (2013.01); *B32B 2305/182* (2013.01); *B32B 2309/105* (2013.01)

(56) References Cited

U.S. PATENT DOCUMENTS

| | | | |
|---|---|---|---|
| 4,123,492 A | 10/1978 | McNamara et al. | |
| 4,336,090 A * | 6/1982 | Hilton | B32B 3/12 |
| | | | 156/154 |
| 4,966,801 A | 10/1990 | Becker et al. | |
| 5,472,769 A | 12/1995 | Goerz, Jr. et al. | |
| 5,490,892 A | 2/1996 | Castagnos et al. | |
| 5,792,555 A | 8/1998 | Bak et al. | |
| 5,958,550 A * | 9/1999 | Childress | B29C 31/08 |
| | | | 428/119 |
| 6,679,969 B1 | 1/2004 | Fournier et al. | |
| 9,314,992 B2 | 4/2016 | Mortimer et al. | |
| 2002/0012767 A1 | 1/2002 | Ueda et al. | |
| 2004/0128946 A1 * | 7/2004 | Salmon | B29C 70/24 |
| | | | 52/782.1 |
| 2009/0186547 A1 | 7/2009 | Coupe et al. | |
| 2010/0297399 A1 | 11/2010 | Utecht et al. | |
| 2011/0002790 A1 | 1/2011 | Ebert et al. | |
| 2012/0168012 A1 | 7/2012 | Statler, III et al. | |
| 2013/0255103 A1 | 10/2013 | Du et al. | |
| 2014/0138872 A1 * | 5/2014 | Hattori | B29C 70/48 |
| | | | 264/250 |
| 2014/0147676 A1 | 5/2014 | Hattori et al. | |
| 2015/0327819 A1 | 11/2015 | Aravamudan | |
| 2016/0075061 A1 | 3/2016 | Waas et al. | |
| 2016/0214332 A1 | 7/2016 | Zhao | |
| 2016/0279885 A1 * | 9/2016 | Cantwell | B32B 7/08 |
| 2017/0067490 A1 | 3/2017 | Dion et al. | |
| 2017/0157865 A1 | 6/2017 | Hattar et al. | |
| 2017/0217843 A1 * | 8/2017 | Boughez | B32B 18/00 |
| 2018/0200714 A1 | 7/2018 | Viovy et al. | |
| 2019/0283345 A1 | 9/2019 | Uesaka et al. | |
| 2020/0189147 A1 | 6/2020 | Conze et al. | |
| 2020/0290296 A1 | 9/2020 | Dumont et al. | |
| 2020/0291552 A1 | 9/2020 | Dumont et al. | |

FOREIGN PATENT DOCUMENTS

| | | |
|---|---|---|
| EP | 0630735 A2 | 12/1994 |
| EP | 0770472 A1 | 5/1997 |
| EP | 1086801 A1 | 3/2001 |
| EP | 2735415 A1 | 5/2014 |
| FR | 3065181 A1 | 10/2018 |
| JP | H06246890 A | 9/1994 |
| JP | H1044281 A | 2/1998 |
| JP | 2000052363 A | 2/2000 |
| JP | 2011510838 A | 4/2011 |
| RU | 2545370 C2 | 3/2015 |
| WO | 2013011884 A1 | 1/2013 |
| WO | 2017103669 A1 | 6/2017 |
| WO | 2018016273 A1 | 7/2018 |
| WO | 2020127057 A1 | 6/2020 |
| WO | 2020182896 A1 | 9/2020 |
| WO | 2020182898 A1 | 9/2020 |

OTHER PUBLICATIONS

Cherif et al. "New process chain for realisation of complex 2D/3D weft knit fabrics for thermoplastic composite applications", Procedia Materials Science 2 (2013) pp. 111-129.
International Search Report and Written Opinion for PCT Application No. PCT/EP2019/085359, dated Feb. 26, 2020, 13 pages.
International Search Report and Written Opinion for PCT/EP2020/056525, dated Jun. 4, 2020, 13 pages.
INPI Preliminary Search Report for FR1902450, dated Nov. 12, 2019, 6 pages.
International Search Report and Written Opinion for PCT/EP2019/085359, dated Feb. 26, 2020, 13 pages.
INPI Preliminary Search Report for FR1873207, dated Oct. 28, 2019, 6 pages.
INPI Preliminary Search Report for FR1902453, dated Dec. 4, 2019, 6 pages.
International Search Report and Written Opinion for PCT/EP2020/056530, dated Jun. 8, 2020, 6 pages.

* cited by examiner

METHOD FOR THE PREPARATION OF COMPOSITE MATERIAL IN SANDWICH FORM

CROSS-REFERENCE TO RELATED APPLICATION(S)

This Application claims priority under 35 U.S.C. § 119 (a)-(d) to French Patent Application No. 1873207, entitled "METHOD FOR THE PREPARATION OF COMPOSITE MATERIAL IN SANDWICH FORM," by Gaëtan MAO et al, filed Dec. 18, 2018, which is assigned to the current assignee hereof and incorporated herein by reference in its entirety.

DETAILED DESCRIPTION

The invention relates to the field of products made of composite material or composite materials. Products made of composite materials means a product that may include a resin matrix consisting of a polymeric material, in particular, thermoplastic or thermosetting material. This matrix may be reinforced by a material that may have a melting point higher than the melting point of the polymeric material. FRP usually refers to "fiber reinforced plastic".

Composite materials of the FRP type have good mechanical resistance with respect to the weight of the material. They also have very good resistance to corrosion. They have properties superior to those of the components taken separately. They allow in particular, in the field of automotive or aeronautics, lightening of parts traditionally made of steel. They also have good resistance to fatigue.

The reinforcements of the composite can be obtained in different ways: by the addition of mineral fibers dispersed in the matrix, by the use of a supporting structure made of steel or synthetic material, by the use of a reinforcing fiber fabric, by the use of non-wovens or mats or other products obtained by textile methods.

The fabric reinforcements may have a flat structure and may be composed of weft yarn and warp yarn intersecting and intertwining perpendicularly. Their manufacture may require the use of a separate spool by warp thread.

More recently, knitted reinforcements have been used. Knitted reinforcements can mean a product generally obtained from continuous yarn where the yarn forms mesh intertwined, arranged in successive rows. The production of a traditional knit requires only a spool of yarn for the yarn mesh.

The yarn may be of the monofilament or multifilament type. The multifilament may be a roving (i.e., set of parallel continuous filaments assembled without torsion), a spun yarn (i.e., a set of short staple fibers assembled with torsion). Yarn may also be an assembly of several yarns or filaments of different materials. This assembly can be done by twisting, wrapping. It is therefore possible to produce yarn comprising polymeric material and reinforcing material. For example, it is possible to assemble reinforcement yarn of the aramid, carbon, glass type, and thermoplastic yarn (i.e. polypropylene, polycarbonate, polyetherimide (PEI)). This type of yarn can then be called mixed yarn.

The knitting of this type of mixed yarn can make it possible to obtain a preform, containing both the reinforcement and the matrix. This preform is said to be "dry", as opposed to the gummy and sticky resin pre-impregnated fabric commonly called "prepreg".

It is also possible to produce products in the form of a sandwich that may include two outer layers, or skins, made of FRP type composite material and a central body, or core, of lighter material of the foam type or cellular honeycomb material. Thanks to their construction in the form of sandwich, these products can achieve, with equal weight, much better performances.

The impregnation of the skins and the binding of these to the core can influence the final properties of the sandwich composite. Good impregnation of the skins generally requires a consolidation method in several stages; which consumes time and resources. This is particularly the case when the finished product has a complex 3D shape.

The traditional methods for making a sandwich can generally include the following steps:

production of the outer layers using skins pre-impregnated with polymeric material;

juxtaposition of the outer layers on either side of a core, for example honeycomb or foam;

consolidation of the outer layers to ensure the melting of the polymeric material, while ensuring the connection of all layers to the core.

Depending on the thickness of the skins, it may be necessary to stack several folds. Several cycles of curing may then be necessary to ensure good consolidation of the fabric folds of each skin and ensure good adhesion between the skins and the core. With this type of manufacturing method, the core of the sandwich can be chosen specifically to resist the curing of the outer layers. In some cases, it has been found that it is impaired by putting under temperature and pressure. It has been observed, for example, that foam cores may sag or shrink during this treatment.

In addition, it also appeared that during curing, polymeric material could flow into the cells of the honeycomb.

Document EP 0 770 472 A1 outlines a method for manufacturing a composite material sandwich panel with a core formed of an open-cell structure and skins formed of fibers and resin. To avoid melting of the resin in the open cells of the core, the document provides for the interposition of a watertight membrane and a film of glue between the skins and the core. After closing the mold, a single thermal cycle makes it possible to polymerize the glue and then to inject the resin under pressure into the fibers and finally to polymerize the resin.

This method, however, has the disadvantage of requiring the use of several layers and in particular a watertight membrane. This increases the costs of the finished product.

Document EP 1 086 801 A1 outlines a method of manufacturing a sandwich panel by the resin injection technique, RTM. To avoid filling the honeycomb structure, this method requires the establishment in the mold of a film of an intumescent material and a barrier fabric on each of the faces of the core.

The method according to the invention uses an insert of heat-resistant material, to form the outer layers, instead of the core and the replacement of the insert by the core when the outer layers are consolidated. All that remains then is to perform heat treatment to bond the outer layers to the core.

According to a first embodiment, the method according to the invention may include the following steps:

Embodiment of outer layers or pre-impregnated skins, for example by knitting or weaving yarns that may include polymeric material and reinforcing material;

Juxtaposition in a mold, of an outer layer, an insert of heat-resistant material and a second outer layer;

Shaping of the skins by curing at a temperature and pressure that can allow consolidation and fusion of the polymeric material without reaching the melting point of the reinforcing material;

Removal of the insert and introduction of the core of the sandwich, for example, of foam or honeycomb, between the 2 preformed skins;

Curing of the assembly at a temperature to allow adhesion between the outer layers and the core of the sandwich.

According to another embodiment, the skins can be made from a textile of reinforcing material and the polymeric material can be provided by injection.

The method may then include the following steps:

Juxtaposition in a mold of a reinforcement fabric, an insert of material resistant to heat then another reinforcing fabric;

Resin injection;

Removal of the insert and introduction of the core of the sandwich, for example of foam or honeycomb, between the 2 preformed skins;

Curing the whole at a temperature allowing adhesion between the outer layers and the core of the sandwich.

The insert may be rigid or not. In particular, it can be silicone.

In some embodiments, it may expand at the temperature. This can allow increasing compression during consolidation.

The insert can provide a particular shape to the finished product, such as for example a beveled shape.

In some embodiments, an adhesive layer may be inserted between the sandwich body and the outer layers. This adhesive may be liquid glue, an adhesive film or a knitted preform comprising thermoplastic fibers.

The outer layers may be the same or different.

Advantageously, to obtain a good sandwich effect, the thickness of the core can be generally at least about 2 mm and not greater than about 50 mm, preferably at least about 3 mm and not greater than about 40 mm, and more preferably at least about 5 mm and not greater than about 25 mm, and the thickness of the skin can be at least about 0.2 mm and not greater than about 5 mm, preferably at least about 0.4 mm and not greater than about 2 mm, and more preferably at least about 0.5 mm and not greater than about 1 mm.

The object of this invention can be to provide an alternative method of manufacturing a sandwich, in particular to provide a manufacturing method that dissociates the choice of material of the body of the sandwich and the choice of the material of the outer layers.

Polymeric material may include thermoplastic materials such as, for example, polycarbonate (PC), polyetherimide (PEI), polypropylene (PP), poly(ethylene terephthalate) (PET), polyether ether ketone (PEEK), or thermosetting materials such as for example epoxy, cyanate ester, phenolic resin, polyester.

Reinforcing material may include synthetic materials, such as para-aramid, polypropylene, natural materials, such as linen, inorganic materials, such as glass, quartz, carbon, basalt, metal.

The method according to the invention has proven particularly advantageous because it can make it possible to dissociate the choice of the type of core of the sandwich from the choice of the transformation method. The method according to the invention can make it possible to achieve good impregnation of the outer skins.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A method of manufacturing a sandwich-shaped composite material product wherein the sandwich-shaped composite material product comprises two outer layers and a core, the outer layers having a matrix of fiber-reinforced polymeric material, the polymeric material having a melting point below the melting point of the material constituting the fibers; wherein the method being characterized in that it uses an insert consisting of material having a melting point higher than the melting point of the polymeric material, on which the outer layers are consolidated; and wherein this insert is subsequently replaced by the core of the sandwich, the assembly then undergoing a consolidation treatment for bonding the outer layers to the core.

Embodiment 2. The method according to embodiment 1, characterized in that it comprises the following steps: production of preforms composed of fiber-reinforced polymeric material intended to become the outer layers of the sandwich, juxtaposition, in a mold, of a first preform, of the insert, and of a second preform, consolidation of the preforms to obtain the outer layers, by heating and pressurizing, to reach the temperature of the melting point of the polymeric material, without reaching the temperature of the melting point of the reinforcing material or the material of the insert, removal of the insert, separation of the outer layers and insertion of the core of the sandwich, heat treatment to adhere the outer layers to the core, cooling of the product thus obtained.

Embodiment 3. The method according to embodiment 2, characterized in that the preforms are made using pre-impregnated polymer resin fabrics.

Embodiment 4. The method according to embodiment 2, characterized in that the preforms are made by knitting a yarn comprising the reinforcing material and the polymeric material.

Embodiment 5. The method according to embodiment 2, characterized in that a peel cost is added between the preforms, at the places intended to form a zone without a core.

Embodiment 6. The method according to embodiment 1, characterized in that it comprises the following steps: juxtaposition, in a mold, of a fabric or knit made of reinforcing material, the insert, and a second fabric or knit made of reinforcing material; injection of a resin of polymeric material under pressure and temperature; removal of the insert and insertion of the core of the sandwich; consolidation curing to adhere the outer layers to the core of the sandwich; cooling of the product thus obtained.

Embodiment 7. The method according to embodiment 1, characterized in that the insert is made of silicone.

Embodiment 8. The method according to embodiment 1, characterized in that the reinforcing material is chosen from glass, carbon and aramid fibers.

Embodiment 9. The method according to embodiment 1, characterized in that the polymeric material is of the thermoplastic type, in particular chosen from polycarbonate (PC), polyetherimide (PEI), polypropylene (PP), poly(ethylene terephthalate) (PET), polyether ether ketone (PEEK).

Embodiment 10. The method according to embodiment 1, characterized in that the polymeric material is of the thermosetting type, in particular chosen from epoxy, cyanate ester, phenolic resins and polyester.

Embodiment 11. The method according to embodiment 1, characterized in that the core of the sandwich consists of cellular honeycomb material.

Embodiment 12. The method according to embodiment 1, characterized in that the thickness of the core is at least about 2 mm and not greater than about 50 mm.

Embodiment 13. The method according to embodiment 1, characterized in that the thickness of each of the outer layers is at least about 0.2 mm and not greater than about 5 mm.

The following examples illustrate the invention in a non-limiting manner.

EXAMPLES

Example 1

Several "prepreg" cyanate ester impregnated carbon fiber fabrics are draped in a steel mold to form the first skin of the sandwich.

A rigid insert (for example a Teflon® block of a few millimeters) is deposited on the fabrics.

The second skin of the sandwich is made by draping several "prepreg" fabrics on the rigid insert.

Teflon-coated peel ply (PTFE-coated glass fibers) is placed at the junction between the two skins. The junction is the area where the skins join to cover the field of the core.

The mold is closed by a flexible counter-mold.

The skins are consolidated by heat treatment under vacuum at about 180-220° C. for a few hours.

The assembly is allowed to cool and the insert is removed.

A high-temperature-resistant glue is applied to each of the faces intended to be in contact with the core.

A polyimide foam-type core (approximate density of 50 kg/m3) is introduced in place of the insert.

The entire sandwich is then subjected to a final consolidation treatment, under vacuum at a temperature of about 90-120° C., so as to ensure good adhesion of the skins and the core.

Example 2

The first skin is formed by a stack of several non-impregnated reinforcing fabrics, of carbon fibers, deposited in a steel mold.

A soft insert (silicone plate a few millimeters thick) is deposited on the fabric.

The second skin is formed by a fabric of the same type deposited on the insert.

The mold is closed by the steel counter mold.

Cyanate ester resin is injected by a known RTM-type method, at a temperature between 80 and 120° C. under a pressure of 10 to 15 bar.

The heat treatment is prolonged for 4 hours.

The mold is allowed to cool, then the insert is removed and the skins are separated by removing the peel ply.

A very thin layer of cyanate ester resin is added to the skins (on the faces intended to come into contact with the honeycomb).

A honeycomb core is introduced between the two skins, in place of the insert, to form a sandwich.

The entire sandwich is subjected to heat treatment (180-200° C.), under vacuum, for 4 hours so as to bond the skins and the core.

Example 3

A knit is made using a mixed yarn comprising glass fibers and thermoplastic fibers.

This knit is deposited in a steel mold to form the first skin.

An insert of material expandable under the effect of temperature is deposited on the knit.

A second knit of the same type is deposited on the insert to form the second skin.

Teflon-coated peel ply (PTFE-coated glass fibers) is placed at the junction between the two skins. The junction is the area where the two skins join to cover the field of the core.

Teflon-coated peel ply is placed at the junction between the two skins.

The mold is closed by a steel counter mold.

The skins are consolidated by heat treatment at 200-250° C., under a pressure of 3 to 10 bar for a few dozen minutes.

The mold is allowed to cool, then the insert is removed and the skins are separated by removing the peel ply.

A knit preform of a thermoplastic yarn is deposited on either side of a honeycomb core, so as to form a connecting layer between the core and the skins of the sandwich.

The honeycomb core and the knit preforms are introduced between the two skins, in place of the insert, to form a sandwich.

The entire sandwich is subjected to heat treatment (200-250° C.), under vacuum, for a few hours, so as to bond the skins and the core.

Example 4

A knit is made using a mixed yarn comprising glass fibers and thermoplastic fibers.

This knit is deposited in a steel mold to form the first skin.

A rigid insert of material expandable under the effect of temperature is deposited on the knit.

A second knit of the same type is deposited on the insert to form the second skin.

Teflon-coated peel ply is placed at the junction between the two skins.

The mold is closed by a steel counter mold.

The skins are consolidated by a heat treatment at 200-250° C., under a pressure of 3 to 10 bar for few dozen minutes.

The mold is allowed to cool, then the insert is removed and the skins are separated by removing the peel ply.

An expanded epoxy foam core is injected between the two skins, in place of the insert, to form a sandwich.

The whole sandwich is subjected to heat treatment (65-120° C.), under vacuum, for a few hours so as to bind the skins and the core.

Example 5

A knit is made using a mixed yarn comprising glass fibers and thermoplastic fibers.

A first knit is draped over a silicone bladder and the assembly is deposited in a first steel mold for the consolidation of the outer skin. The mold is closed and a vacuum is drawn. The mold is pressurized (3 to 10 bar) and heated rapidly by induction heating to a temperature of 200 to 250° C. The temperature is maintained for a few minutes. After cooling, the bladder is removed and a first skin is thus produced.

A second skin (inner skin) is made in the same way as the first in a second mold.

In the tooling used to consolidate the outer skin, the following is deposited successively: the external skin previously consolidated, an epoxy or liquid form glue film, a honeycomb structure, the previously consolidated internal skin of the final composite product.

The silicone bladder used to consolidate the inner skin is put in place and the mold is closed. A vacuum is drawn to the maximum and the assembly is heated to a temperature of 65-120° C. for a few hours (oven heating method) so as to bond the skins and the core.

What is claimed is:

1. A method of manufacturing a sandwich-shaped composite material product wherein the sandwich-shaped composite material product comprises two outer layers and a core, the outer layers having a matrix of fiber-reinforced polymeric material, the polymeric material having a melting point below the melting point of the material constituting the fibers;
    wherein the method is characterized in that it uses an insert consisting of material having a melting point higher than the melting point of the polymeric material, on which the outer layers are consolidated;
    wherein this insert is subsequently replaced by the core of the sandwich-shaped composite material product to form an assembly, the assembly then undergoing a consolidation treatment for bonding the outer layers to the core; and
    wherein the method is further characterized in that it comprises the following steps:
        production of preforms composed of the fiber-reinforced polymeric material intended to become the outer layers of the sandwich-shaped composite material product,
        juxtaposition, in a mold, of a first preform of the preforms, of the insert, and of a second preform of the preforms,
        consolidation of the preforms to obtain the outer layers, by heating and pressurizing, to reach the temperature of the melting point of the polymeric material, without reaching the temperature of the melting point of the reinforcing material or the material of the insert,
        removal of the insert, separation of the outer layers and insertion of the core of the sandwich-shaped composite material product,
        heat treatment to adhere the outer layers to the core,
        cooling of the product thus obtained.

2. The method according to claim 1, characterized in that the preforms are made using pre-impregnated polymer resin fabrics.

3. The method according to claim 1, characterized in that the preforms are made by knitting a yarn comprising the reinforcing material and the polymeric material.

4. The method according to claim 1, characterized in that a peel layer is added between the preforms, at places intended to form a zone without a core.

5. The method according to claim 1, characterized in that the insert is made of silicone.

6. The method according to claim 1, characterized in that the reinforcing material is chosen from glass, carbon and aramid fibers.

7. The method according to claim 1, characterized in that the polymeric material is of the thermoplastic type chosen from polycarbonate (PC), and polyetherimide (PEI), polypropylene (PP), poly(ethylene terephthalate) (PET), and polyether ether ketone (PEEK).

8. The method according to claim 1, characterized in that the polymeric a material is of the thermosetting type chosen from epoxy, cyanate ester, phenolic resins and polyester.

9. The method according to claim 1, characterized in that the core of the sandwich-shaped composite material consists product of cellular honeycomb material.

10. The method according to claim 1, characterized in that the thickness of the core is at least about 2 mm and not greater than about 50 mm.

11. The method according to claim 1, characterized in that the thickness of each of the outer layers is at least about 0.2 mm and not greater than about 5 mm.

* * * * *

UNITED STATES PATENT AND TRADEMARK OFFICE
CERTIFICATE OF CORRECTION

PATENT NO. : 11,420,368 B2  
APPLICATION NO. : 16/714965  
DATED : August 23, 2022  
INVENTOR(S) : Gaëtan Mao et al.

Page 1 of 1

It is certified that error appears in the above-identified patent and that said Letters Patent is hereby corrected as shown below:

On the Title Page

In Column 2, Item (56), U.S. PATENT DOCUMENTS, page 2, Line 2, please delete "Du et al." and insert --DUA et al--

In Column 2, Item (56), U.S. PATENT DOCUMENTS, page 2, Line 12, please delete "Boughez" and insert --BOUCHEZ--

In the Specification

In Column 7, Line 28, please delete "outer lavers of" and insert --outer layers of--

In Column 8, Line 22, please delete "polycarbonate (PC), and polyetherimide" and insert --polycarbonate (PC), polyetherimide--

In Column 8, Line 26, please delete "polymeric a material" and insert --polymeric material--

In Column 8, Line 29-30, please delete "material consists product of" and insert --material product consists of--

Signed and Sealed this  
Twenty-sixth Day of September, 2023

Katherine Kelly Vidal  
*Director of the United States Patent and Trademark Office*